United States Patent Office 3,310,315
Patented Mar. 21, 1967

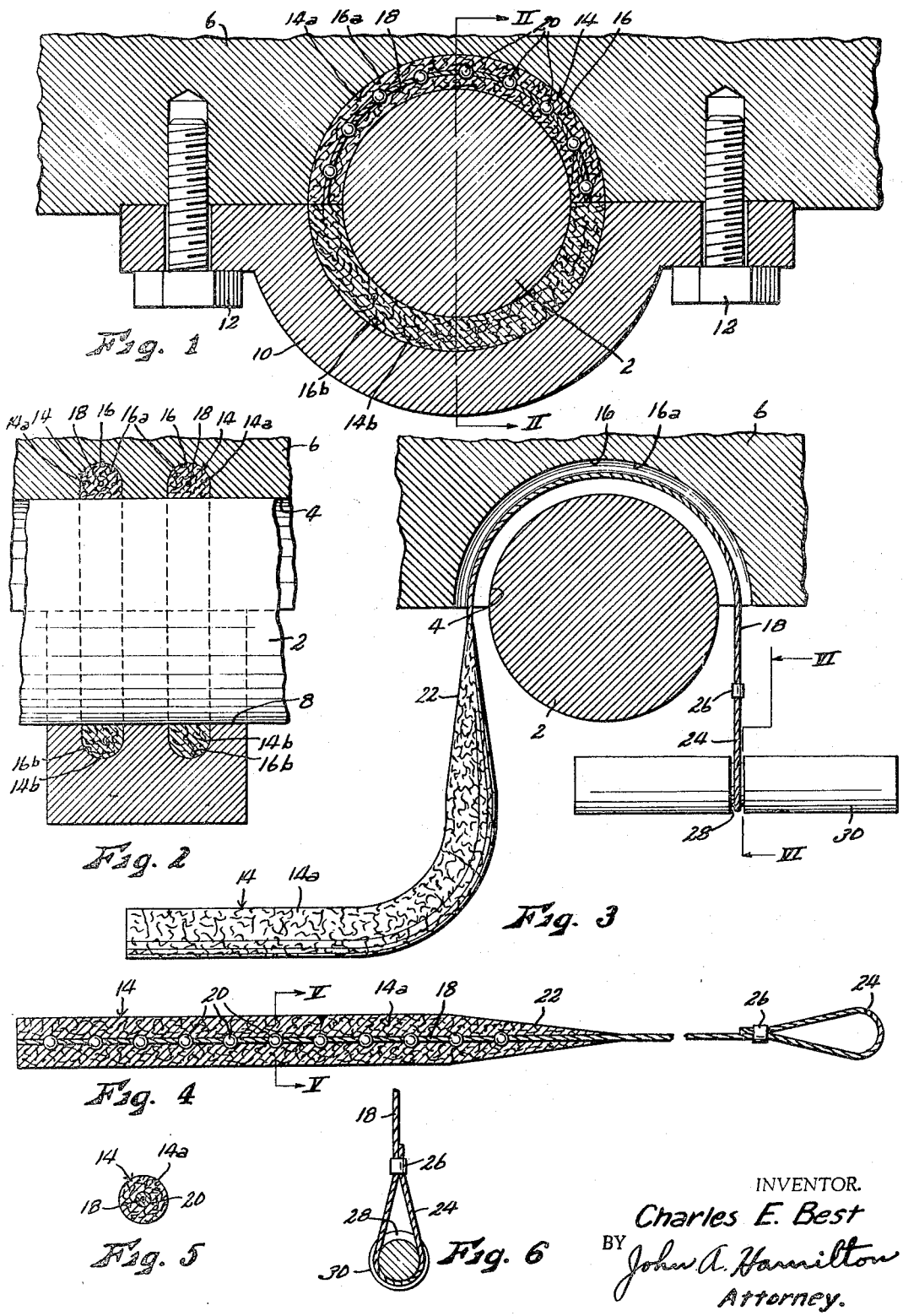

3,310,315
SELF-INSERTING SEAL FOR BEARINGS
Charles E. Best, 1313 S. 36th St.,
Kansas City, Kans. 66106
Filed Jan. 28, 1965, Ser. No. 428,763
3 Claims. (Cl. 277—10)

This invention relates to new and useful improvements in sealing devices for bearings, and has particular reference to sealing devices for journal-type bearings.

In journal-type bearings, generally, a shaft is supported rotatably in a pair of confronting semi-cylindrical journal bores formed respectively in a pair of bearing blocks, and a seal is utilized to prevent leakage of oil or other lubricant around the shaft, said seal most commonly consisting of one or more rings of compressible material surrounding the shaft and contained in internal peripheral grooves formed in the bearing blocks and impregnated with graphite or the like, being sufficiently resilient to press tightly against the shaft and absorbent to retain and dispense oil or grease as required. The replacement of these seals when they become worn is often a very tedious operation requiring a rather complete dismantling of the related machinery, and it is toward the alleviation of this difficulty that the present invention is directed. My invention has been developed primarily for the purpose of facilitating the insertion of seals in the main bearings of automobile engines, and it will be described primarily in this connection, although it has application to bearings generally, as will appear.

The principal object of the present invention is the provision of a seal so constructed that when one of the bearing blocks is removed, which is generally possible without general dismantling of the related machinery, said seal may be pulled longitudinally into position in the seal groove of the other bearing block, without removing the shaft from said other bearing block. Generally, this object is accomplished by providing the seal, which is usually a braided textile cord, with a longitudinal extension constituting a strong flexible cable of much smaller diameter than the seal cord, said cable being threaded through the seal groove of the bearing block, around the shaft, so that pulling on the free end of the cable will draw the seal cord into position in the groove.

Another object is the provision of a seal of the character described so constructed that despite the fact that it must be formed of soft, flexible, and at least stiffly pilable and compressible material, it will not be stretched or deformed by the considerable tensile stress exerted thereon as it is drawn into the groove of the bearing block. This object is accomplished by extending the cable referred to above throughout the length of the seal cord, and by providing means preventing said cable from moving or slipping longitudinally with respect to the cord.

Other objects are simplicity and economy of construction, efficiency and dependability of operation, and adaptability for use in a wide variety of bearing constructions.

With these objects in view, as well as other objects which will appear in the course of the specification, reference will be had to the accompanying drawing, wherein:

FIG. 1 is a fragmentary sectional view, taken at right angles to its axis, of a shaft and a journal bearing therefor, including seals embodying the present invention.

FIG. 2 is a fragmentary sectional view taken on line II—II of FIG. 1,

FIG. 3 is a view similar to FIG. 1, but with the lower bearing block removed and the seal positioned preparatory to insertion thereof, FIG. 4 is a longitudinal sectional view of the seal, partially broken away and foreshortened, FIG. 5 is a sectional view taken on line V—V of FIG. 4, and FIG. 6 is a fragmentary sectional view taken on line VI—VI of FIG. 3.

Like reference numerals apply to similar parts throughout the several views, and the numeral 2 applies to a rotatable cylindrical shaft supported in a semi-cylindrical journal bore 4 of an upper bearing block 6, and a matching semi-cylindrical journal bore 8 of a lower bearing block 10, said bearing blocks being releasably secured together by screws 12. In the case of an automobile main bearing, shaft 2 is the engine crankshaft, and upper bearing block 6 is the engine block. Generally, the lower bearing block 10 may be removed simply by removing screws 12, without further dismantling of the engine, while dropping the shaft below block 6 requires a general disassembly of the engine, and is a major, time-consuming operation.

The bearing thus far described is usually sealed by means of one or more flexible "cords" 14 of sealing material each contained in a groove 16 formed peripherally about the shaft in bearing blocks 6 and 10. Said cords are formed of compressible, absorbent material, usually braided textile strands, which is sufficiently yieldable to be conformed to the cross-sectional contour of groove 16, and sufficiently resilient to press snugly against the walls of the grooves and against the surface of shaft 2. As shown, each cord 14 is divided at the juncture plane of the bearing blocks, that portion of groove 16 formed in upper block 6 being further designated by the numeral 16a, and the sealing cord disposed therein being further designated by the numeral 14a, while the portion of groove 16 in lower block 10, and the portion of cord 14 disposed therein, are further designated respectively by the numerals 16b and 14b. Since lower bearing block 10 may be removed to provide easy access to groove 16b thereof, the replacement of seal cord 14b is no problem, said cord merely being pressed firmly into the groove by hand, and then cut accurately to the proper length. Thus seal cord 14b can be of the usual construction already described, which is standard. However, such easy access cannot be had to groove 16a without removing shaft 2 from the upper bearing block, which as outlined above requires a general disassembly of the engine, and it is hence the provision of a seal cord which may be fed longitudinally through groove 16a, without separating shaft 2 from block 6, which forms the subject matter of the present invention.

As best shown in FIGS. 3–5, the cord 14a is originally formed as a length of seal cord formed as previously described of flexible, resiliently compressible material such as braided textile strands, but having a core consisting of a flexible steel cable 18 of much smaller diameter than the seal cord. The cord itself is generally circular in cross-section, and the cable is disposed centrally therein as best shown in FIG. 5. The cord is of such diameter that when it is compressed to the cross-sectional contour of groove 16a, it will completely fill said groove and exert a resilient outward force on the walls thereof. Cable 18 extends throughout the length of the cord, and has a series of enlargements 20 formed thereon in closely spaced relation throughout the length of the cord. Said enlargement may be formed, for example, by globs of solder applied to the cable. One end of the cord is tapered as indicated at 22, although the untapered portion thereof must at least as long as the linear length of groove 16a. For reasons which will presently appear, at least one of enlargements 20 should be disposed in the tapered portion of the cord.

Cable 18 extends longitudinally from the tapered end of the cord, the extended portion being longer than the linear length of groove 16a. The extreme free end portion of the cable is rebent on itself to form a loop 24 secured by a clamp 26. Said loop is operable to be engaged removably in a peripheral groove 28 of a handle 30 consisting of a short steel bar or the like. The external surface of the cord is graphited or otherwise lubricated to facilitate its entry into groove 16a.

The mode of insertion of seal 14a is best shown in FIG. 3. After lower bearing block 10 has been removed and the old and worn seal 14a has been removed by pushing on one end thereof with any suitable flexible tool, the free end of cable 18, with handle 30 removed, is pushed through groove 16a until loop 24 projects from the opposite end of the groove. This is done easily because loop 24 is flexible and is easily compressible to pass through the groove, and because the steel cable, while flexible, is sufficiently stiff to be pushed through the groove. The handle 30 is then reinserted through loop 24, and used as a hand grip for pulling the seal 14a into groove 16a by means of cable 18. After the seal is pulled fully into place, with both ends thereof projecting outwardly from the ends of groove 16a, the projecting ends thereof, including cable 18, are cut away flush with the ends of the groove. Lower bearing block 10 is then reaffixed by screws 12, and the resealing operation is complete.

The extension of cable 18 throughout the length of the seal cord, and the provision of enlargements 20 thereon, are extremely important features of my invention. If the seal cord, without a core, were pulled from its leading end only, the substantial tension necessarily exerted thereon would cause it to lengthen or stretch, due to its inherently rather soft and yieldable consistency. Such lengthening would of course reduce diameter, so that it would not completely fill the cross-sectional contour of groove 16a. Thus leakage of oil could occur around the seal, which thus would fail in its primary function. With a shaft about two inches in diameter as in the usual automotive crankshaft, an ordinary seal cord, without a core such as cable 18, may stretch as much as an inch when pulled through groove 16a by a gripper attached only to its leading end. In the present structure, cable 18 itself, not the cord, supports the tensile force exerted in pulling the cord into the groove, so that there is no tendency to stretch the textile strands of the cord.

In order for the cable to properly perform its function as just described, it is necessary that the strands of the cord be affixed to the cable, either continuously, or at least at closely spaced points along its length. Otherwise the cord would tend to jam and be arrested at the entry end of the groove, while the cable would simply slip through the cord and pull out. It is not practical to bond the cord continuously to the cable, due both to the yieldable nature of the cord, and also because the strands of the cord are usually and desirably coated or impregnated with a lubricant. The enlargements 20 solve the problem in that as the cord material is compressed firmly about the said enlargements by entry of the cord into groove 16a, they form anchors positively resisting relative longitudinal slippage of the cable in the cord. The tapered end 22 of the cord, and the graphite coating of the cord, facilitate entry thereof into the groove. It is obviously important that at least the first enlargement 20 to enter the groove have the cord material pressed tightly thereabout before the maximum tension required to pull the cord into the groove is exerted, so that it will provide its anchoring effect before slippage of the cable can occur. For this reason, it is preferable that at least one, and preferably more, of said enlargements be disposed in the tapered portion of the cord as shown. Another method of securing the cable in the cord is to intertwine the wires of which the cable is formed with at least the central textile strands of the cord. However, this method is less desirable than that shown for at least two reasons. Firstly, it poses rather difficult manufacturing problems and secondly it is less efficient in that it may still permit longitudinal slippage of the cable by displacing only a few of the relatively pliable textile strands. It is not practical to interweave the cable wires with all of the cord strands, since to do so would cause exposure of some of the wires at the external surface of the cord, and these exposed wires would cause scratching and scoring of the shaft surface.

While I have shown and described a specific embodiment of my invention, it will be readily apparent that many minor changes of structure could be made without departing from the spirit of the invention as defined by the scope of the appended claims.

What I claim as new and desire to protect by Letters Patent is:

1. A bearing seal structure comprising:
   (a) a cord-like seal of flexible, absorbent material which is soft and yieldable,
   (b) a flexible strand of strong material of smaller diameter than said seal extending throughout the length of said seal to form a core therein, and extending longitudinally from one end of said seal,
   (c) means affixing said flexible strand in said seal at closely spaced intervals therealong whereby to prevent relative longitudinal slippage between said strand and said seal, and
   (d) operating means consisting of a handle member adapted to be attached to the extended free end of said flexible strand.

2. The structure as recited in claim 1 wherein said affixing means comprises enlargement members affixed to said flexible strand at closely spaced apart points throughout the length of said seal.

3. The structure as recited in claim 1 wherein the end portion of said seal at the end thereof from which said flexible strand extends is taperingly reduced in diameter.

References Cited by the Examiner

UNITED STATES PATENTS

| | | | |
|---|---|---|---|
| 716,836 | 12/1902 | Garlock | 277—230 |
| 2,621,398 | 12/1952 | Simmons | 277—1 X |
| 3,084,423 | 4/1963 | Fullerton. | |
| 3,112,112 | 11/1963 | Wright | 277—11 |
| 3,171,193 | 3/1965 | Bowden. | |

SAMUEL B. ROTHBERG, *Primary Examiner.*